T. DONOHOE.
CAR WHEEL AND MOUNTING.
APPLICATION FILED AUG. 23, 1907.
938,988.
Patented Nov. 2, 1909.
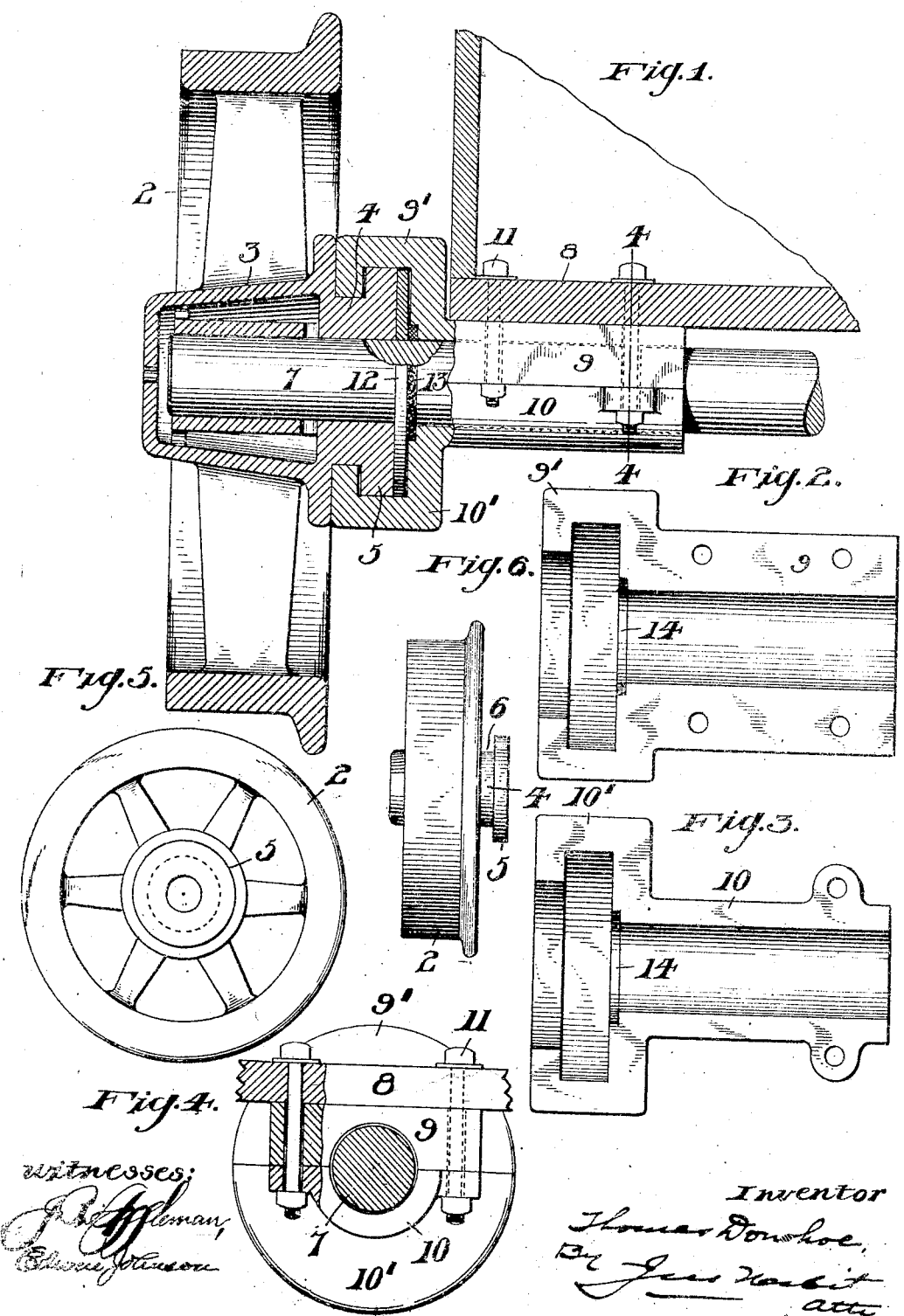

UNITED STATES PATENT OFFICE.

THOMAS DONOHOE, OF AVELLA, PENNSYLVANIA.

CAR-WHEEL AND MOUNTING.

938,938.

Specification of Letters Patent. Patented Nov. 2, 1909.

Application filed August 23, 1907. Serial No. 389,867.

*To all whom it may concern:*

Be it known that I, THOMAS DONOHOE, of Avella, in the county of Washington and State of Pennsylvania, have invented certain new and useful Improvements in Car-Wheels and Mountings, of which the following is a specification.

This invention relates primarily to wheels and wheel mountings for mine cars, and its primary object is to provide improved means for securing the wheels to the car, such means consisting of an interlocking connection between the rear part of the wheel and the axle bearing fixed to the car bottom, whereby the wheel may turn without interference and yet is held positively and securely in position.

A further purpose is to so mount the wheels as to cause them to retain the proper gage notwithstanding the rough wear and usage of the cars.

In the accompanying drawings, Figure 1 is a vertical sectional view of a wheel and bearing constructed in accordance with the invention, portions of the axle and car being shown. Figs. 2 and 3 are detail views of the parts of the bearing. Fig. 4 is a cross sectional view taken on line 4—4 of Fig. 1. Figs. 5 and 6 are detail views of the wheel.

Referring to the drawings, 2 designates the wheel and 3 the chambered hub thereof. On the rear face of the wheel is the annular hub-like extension 4 having the outer portion of its periphery flanged or enlarged at 5, the annular space between this enlargement and the body of the wheel being indicated at 6.

7 is the axle upon which the wheel turns, and the axle is preferably rotatable within the bearings secured to the car bottom 8. Each of these bearings is formed in two parts 9 and 10, which are adapted to fit together and are secured to the car bottom by bolts 11. The outer ends of parts 9 and 10 are formed with the semi-circular enlargements 9' and 10' respectively, having their inner faces so recessed as to embrace the hub-like extension 4 and flange 5, thereby interlocking with the wheel and securely holding the same without interfering with its rotation. The engaging surfaces of the wheel and bearing formed by this interlocking connection are of such considerable area that it is impossible for the wheels to get out of gage until they become very much worn.

The invention is designed primarily for use with wheels known in the trade as cap wheels—that is, a wheel having its hub closed at the front to form a portion of the oil chamber. However, the invention is not limited in this regard. To prevent the oil from working backward through the bearing, I prefer to shrink a washer 12 on the axle within the bearing cavity, and adjacent this washer is the felt-like ring 13, which encircles the axle, being confined in extension 14 of the bearing cavity. Escape of the oil is thus prevented, as no appreciable amount will work out through the circuitous course formed by the interlocking faces of the wheel enlargement and the bearing. The wheel turns freely on the axle, and the axle is freely rotatable in the bearing, although if desired the axle may be held against rotation without departing from the spirit of the invention.

I claim:—

1. The combination of a car body, wheels at opposite sides thereof each having an annular flange on its inner side, two separated bearings secured to opposite portions of the car, an axle extending through the bearings and into the wheels, each of said bearings formed in parts fitting together and recessed at their outer ends which embrace the annular flange of one of the wheels.

2. The combination of a wheel having an annular hub-like extension on its rear face formed with a peripheral enlargement, an axle, and a two-part bearing for the axle fastened to the car with the axle extending therethrough, each of the bearing parts having an enlargement at its outer end formed with a semi-circular recess to embrace the flanged extension of the wheel, whereby when the bearing parts are united the wheel extension is inclosed and the wheel held in place.

3. The combination of a wheel having an extension on its rear face, an axle, a bearing member fixed to the car and through which the axle extends, said member interlocking with the wheel extension for holding the wheel in place, and a washer shrunk on the axle within the bearing cavity, for the purpose described.

4. The combination of a wheel having an extension on its rear face, an axle, a bearing member fixed to the car and through which the axle extends, the bearing member interlocking with the wheel extension for holding the wheel in place, a washer shrunk on the axle within the bearing cavity, and a felt-like ring encircling the axle adjacent the washer.

5. The combination of a car body, two separate and distinct bearings—one at each side of the car bottom, each bearing extending inwardly from the side of the car a relatively short distance and each formed of an upper and lower section with securing bolts extending therethrough and into the car bottom, each of the sections enlarged at its outer end and formed with an internal countersunk depression, an axle extending through the bearings, wheels mounted on the ends of the axle, and peripherally flanged annular extensions on the inner sides of the wheels embraced by and confined in the enlarged ends of the bearing sections.

In testimony whereof I affix my signature in presence of two witnesses.

THOMAS DONOHOE.

Witnesses:
 Don J. Hill,
 L. M. Irwin.